United States Patent
Cretekos et al.

(10) Patent No.: US 6,773,818 B2
(45) Date of Patent: Aug. 10, 2004

(54) METALLIZED, METALLOCENE-CATALYZED, POLYPROPYLENE FILMS

(75) Inventors: George F. Cretekos, Farmington, NY (US); Moris Amon, Pittsford, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 0 days.

(21) Appl. No.: 10/236,701

(22) Filed: Sep. 6, 2002

(65) Prior Publication Data

US 2004/0053066 A1 Mar. 18, 2004

(51) Int. Cl.$^7$ .......................... B32B 27/32; B32B 15/08
(52) U.S. Cl. ...................... 428/461; 428/515; 428/516
(58) Field of Search ............................... 428/515, 516, 428/461

(56) References Cited

U.S. PATENT DOCUMENTS

| | | | |
|---|---|---|---|
| 3,753,769 A | 8/1973 | Steiner | 117/122 H |
| 4,214,039 A | 7/1980 | Steiner et al. | 428/414 |
| 4,377,616 A | 3/1983 | Ashcraft et al. | 428/213 |
| 4,447,494 A | 5/1984 | Wagner, Jr. et al. | 428/349 |
| 4,632,869 A | 12/1986 | Park et al. | 428/315.5 |
| 4,794,096 A | 12/1988 | Ewen | 502/117 |
| 4,865,908 A | 9/1989 | Liu et al. | 428/248 |
| 4,892,851 A | 1/1990 | Ewen et al. | 502/104 |
| 4,961,992 A | 10/1990 | Balloni et al. | 428/332 |
| 4,975,403 A | 12/1990 | Ewen | 502/113 |
| 5,019,447 A | 5/1991 | Keller | 428/327 |
| 5,036,034 A | 7/1991 | Ewen | 502/117 |
| 5,057,177 A | 10/1991 | Balloni et al. | 156/244.11 |
| 5,155,080 A | 10/1992 | Elder et al. | 502/152 |
| 5,158,920 A | 10/1992 | Razavi | 502/152 |
| 5,162,278 A | 11/1992 | Razavi | 502/152 |
| 5,254,394 A | 10/1993 | Bothe et al. | 428/212 |
| 5,462,807 A | 10/1995 | Halle et al. | 428/500 |
| 5,468,440 A | 11/1995 | McAlpin et al. | 264/291 |
| 5,529,843 A | 6/1996 | Dries et al. | 428/336 |
| 6,268,062 B1 * | 7/2001 | DeMeuse | 428/461 |
| 6,410,124 B1 * | 6/2002 | Peet | 428/215 |
| 6,503,635 B1 * | 1/2003 | Kong et al. | 428/461 |

FOREIGN PATENT DOCUMENTS

| | | |
|---|---|---|
| EP | 668 157 A1 | 8/1995 |
| WO | WO 99/67094 | 12/1999 |
| WO | WO 00/58088 | 10/2000 |
| WO | WO 01/03920 | 1/2001 |
| WO | WO 03/072357 | 9/2003 |

* cited by examiner

*Primary Examiner*—D. Lawrence Tarazano
(74) *Attorney, Agent, or Firm*—Rick F. James

(57) ABSTRACT

An oriented multilayer film containing a core layer and a first skin layer, wherein the first skin layer includes a metallocene-catalyzed propylene homopolymer or copolymer, and the first skin layer is metallized. The film may also contain additional layers, such as a second skin layer for heat-sealing, and one or more tie layers. The film may be laminated to other films or non-films. The film exhibits excellent water vapor transmission rates (WVTR) and oxygen transmission rates (OTR).

20 Claims, No Drawings

METALLIZED, METALLOCENE-CATALYZED, POLYPROPYLENE FILMS

TECHNICAL FIELD

The present invention relates to a film that contains a skin layer of metallocene-catalyzed, substantially isotactic propylene homopolymer or metallocene-catalyzed propylene copolymer. The film may be oriented. The skin layer may be metallized on its outer surface.

BACKGROUND

Metallocene-catalyzed propylene polymers, which have low melting temperatures relative to conventional propylene polymers, are known. Due to their relatively low melting temperatures, metallocene-catalyzed propylene polymers have been described as a useful heat seal material, e.g., as the heat-sealable outer layer of a multilayer film in U.S. Pat. No. 5,468,440. The '440 patent suggests temperatures at which metallocene-catalyzed, isotactic polypropylene plaques or cast samples can be stretched in laboratory equipment. The suggested temperatures, however, are not suitable for continuous orientation processing. The '440 patent further fails to disclose metallizing the metallocene-catalyzed polypropylene layer or layers.

U.S. Pat. Nos. 5,529,843 and 5,462,807 also describe the advantages of a multilayer film that has an outer layer that contains a metallocene-catalyzed polymer. The '843 and '807 patents, however, fail to disclose or suggest the use of a metallocene-catalyzed propylene polymer in a metallized skin layer of a multilayer film.

Metallocene-catalyzed, isotactic polypropylenes have a very narrow molecular weight distribution, i.e., a very narrow range of chain lengths. Ziegler-Natta-catalyzed, isotactic polypropylenes, by contrast, have a broad range of chain lengths, which average out at the desired level. For good operability in the oriented polypropylene (OPP) process, those of skill in the art typically desire a broad molecular weight distribution. The high molecular weight tails of Ziegler-Natta-catalyzed polypropylenes tend to distribute the stretching forces more uniformly in oriented films, preventing stress concentrations, and ultimately providing more uniform orientation and improved operability. Therefore, although the narrow composition distribution of metallocene-catalyzed, isotactic propylene polymers causes them to be looked upon favorably for film properties, e.g., heat-sealability, their narrow molecular weight distribution causes them to be looked upon negatively for operability in the OPP process.

For this reason, multilayer films, and especially oriented multilayer films, disclosed in the prior art have generally used traditional Ziegler-Natta-catalyzed polymers, which have a broad molecular weight distribution, in the skin or metallization layer and/or the core layer to distribute orientation stresses more uniformly and avoid film breakage during orientation.

SUMMARY

There is provided an oriented multilayer film, comprising:
a) a core layer comprising a polyolefin; and
b) a first skin layer comprising a polyolefin selected from the group consisting of (i) a metallocene-catalyzed, substantially isotactic propylene homopolymer, (ii) a metallocene-catalyzed propylene copolymer, and (iii) blends thereof, wherein the core layer has a first surface and a second surface, the first skin layer has a first and a second surface, the second surface of the first skin layer is contiguous to and in contact with the first surface of the core layer, and the first surface of the first skin layer is metallized.

The oriented multilayer film may optionally comprise a second skin layer on the side of the core layer opposite the first skin layer, and one or more tie layers between the core layer and the first skin layer and between the core layer and the second skin layer (if any). A coating may optionally be applied to one or both outer surfaces of the film, including the outer surface of the core layer if a second skin layer is not present, the outer surface of the second skin layer, and the metallized surface of the first skin layer. The film may optionally be laminated to a substrate at one or both of its outer surfaces, again including the outer surface of the core layer if a second skin layer is not present, the outer surface of the second skin layer, and the metallized surface of the first skin layer.

The oriented multilayer film may have an oxygen transmission rate (OTR) of $\leq 20$ cc/m$^2$/24 hr, as determined in accordance with ASTM D 3985 at 73° F. (23° C.) and 0% relative humidity (RH), and a water vapor transmission rate (WVTR) of $\leq 0.50$ g/m$^2$/24 hr, as determined in accordance with ASTM F 1249 at 100° F. (37.8° C.) and 90% RH.

There is also provided a process for producing an oriented multilayer film, comprising:
a) coextruding melts corresponding to the core layer and the first skin layer to form a coextruded sheet;
b) cooling the coextruded sheet;
c) orienting the coextruded sheet to form an oriented multilayer film; and
d) metallizing the oriented multilayer film on the first surface of the first skin layer.

A multilayer film according to the present invention provides several advantages, mainly as a result of the advantageous interface between the first skin layer and the metal layer deposited thereon. It possesses unexpectedly superior oxygen transmission rates (OTR) and water vapor transmission rates (WVTR), both initially after manufacture and throughout the various stages of the converting process. The film, moreover, is surprisingly operable in orientation processes, and, when subsequently metallized, demonstrates good metal adhesion between the metal layer and the metallizable skin layer, e.g., the first skin layer.

DETAILED DESCRIPTION

Skin Layers
  First Skin Layer

A multilayer film according to the present invention comprises a first skin layer. The first skin layer may comprise a metallocene-catalyzed propylene homopolymer or a metallocene-catalyzed propylene copolymer. The metallocene-catalyzed propylene homopolymer may be a metallocene-catalyzed, substantially isotactic propylene homopolymer. The phrases "substantially isotactic propylene homopolymer" or "substantially isotactic polypropylene", as used herein, generally refer to propylene polymers which have an isotacticity of 85% or greater (as measured by solubility in xylene). Exemplary isotactic propylene polymers and/or methods for making such polymers are described in the following patent documents: U.S. Pat. Nos. 5,529,843; 5,162,278; 5,158,920; 5,155,080; 5,036,034; 4,975,403; 4,892,851; and 4,794,096, all of which are incorporated herein by reference.

As described above, the metallocene-catalyzed propylene polymers of the first skin layer may include homopolymers and/or copolymers that contain other monomeric units, as in the case of a copolymer of propylene and ethylene or an α-olefin having from 4 to 20 carbon atoms, e.g., butene-1, pentene-1, hexene-1, heptene-1, 4-methyl-1-pentene, octene-1 or combinations thereof. Also contemplated are metallocene-catalyzed propylene terpolymers, including, but not limited to, propylene-ethylene-butene-1, propylene ethylene-pentene-1, propylene-ethylene-hexene-1, propylene-ethylene-octene-1, and the like.

The metallocene-catalyzed propylene polymer, whether a homopolymer or copolymer, may have a melting point of $\leq 160°$ C., or $\leq 154°$ C., or $\leq 145°$ C., preferably from $120°$ C. to $155°$ C., e.g., from $130°$ C. to $150°$ C. The foregoing melting point ranges were determined by an ExxonMobil method outlined herein below. In general, the melt flow rate of the metallocene-catalyzed propylene polymers will be in the range of from 0.5 g/10 min to 20 g/10 min at $230°$ C., for example, from 2.5 g/10 min to 15 g/10 min, e.g., from 4 g/10 min to 9 g/10 min, as measured by ASTM D-1238 at $230°$ C.

The first skin layer may also comprise blends of two or more propylene homopolymers, or blends of two or more propylene copolymers, or at least one propylene homopolymer and at least one propylene copolymer, each differing in their molecular or macro properties or both. The only requirement of such blends, aside from the physical properties described above, is that they have a majority component or components, i.e., more than 50 weight percent, that are metallocene-catalyzed propylene homopolymers or copolymers. In other embodiments, the first skin layer will consist essentially of a metallocene-catalyzed propylene homopolymer, a metallocene-catalyzed propylene copolymer, or blends thereof. By "consist essentially," it is meant that the first skin layer excludes all other film-forming polyolefins, including Ziegler-Natta-catalyzed polypropylenes.

In a film structure according to the present invention, the first skin layer may be contiguous to and in contact with the core layer. Alternatively, one or more intermediate, or tie, layers may be disposed between the first skin layer and the core layer. In such a case, the first skin layer will be contiguous to and in contact with a tie layer, and the core layer will be contiguous to and in contact with a tie layer. As will be readily understood, if there is only one tie layer disposed between the first skin layer and core layer, then the tie layer that is contiguous to and in contact with the core layer is the same tie layer that is contiguous to and in contact with the first skin layer.

Second Skin Layer

A multilayer film according to the present invention may optionally comprise a second skin layer. The second skin layer may be any of the coextrudable, orientable film-forming resins known in the art, including substantially isotactic polypropylene, substantially syndiotactic polypropylene, copolymers of propylene with ethylene and/or an α-olefin having from 4 to 20 carbon atoms, and terpolymers of propylene with ethylene and/or butene-1 and/or another α-olefin(s). The phrase "substantially syndiotactic polypropylene", as used herein, generally refers to a propylene polymer that has a syndiotacticity of 70% or greater based on racemic pentads (measured according to $^{13}$C NMR spectroscopy). The coextrudable, orientable film-forming resins of the second skin layer include, but are not limited to, Ziegler-Natta-catalyzed (Z-N) and metallocene-catalyzed (m) polymers More specific examples of copolymers for the second skin layer include ethylene-propylene random copolymers, ethylene-butene-1 copolymers (EB), propylene-butylene random copolymers (PB), and ethylene-propylene block/impact copolymers (EP). More specific examples of terpolymers for the second skin layer include random ethylene-propylene-butene-1 terpolymers (EPB), and block terpolymers of ethylene, propylene and butene-1. Ethylene-propylene-butene-1 random terpolymers appropriate for use in the second skin layer include those containing from 0.25 to 7 wt % random ethylene and from 0.25 to 35 wt % random butene-1, with the balance being made up of propylene. The amounts of the random ethylene and butene-1 components in these terpolymers are typically in the range of from 5 to 25 wt % (ethylene plus butene-1), based on the total weight of the copolymer. The copolymers and terpolymers typically have a melt flow rate in the range of from 0.5 to 20 g/10 min, e.g., from 5 to 10 g/10 min., and a melting point in the range of $\leq 160°$ C.

In certain embodiments of the invention, the second skin layer may comprise a polyethylene. Suitable polyethylenes for the second skin layer include very low density polyethylene (VLDPE), low density polyethylene (LDPE), linear low-density polyethylene (LLDPE), medium density polyethylene (MDPE) or high density polyethylene (HDPE). These ethylene polymers generally have a melt index ranging from 0.3 to 15 g/10 min, as measured by ASTM D-1238 @190°C.

VLDPE, which is sometimes referred to as ultra low density polyethylene (ULDPE), is a very low density polyethylene typically having a density at or below 0.915 g/cm$^3$, e.g., from about 0.86 to about 0.915 g/cm$^3$. VLDPE is typically produced in a high pressure, peroxide-catalyzed reaction or in a solution process. When produced using a metallocene or single-site catalyst, VLDPE is commonly referred to as a type of plastomer.

LDPE typically has a density in the range of from 0.90 g/cm$^3$ to 0.94 g/cm$^3$, e.g., from 0.910 g/cm$^3$ to 0.926 g/cm$^3$. LDPE may be derived solely from ethylene, e.g., in a high pressure, peroxide-catalyzed reaction, or from ethylene together with a comonomer, including but not limited to higher olefin comonomers containing 4 to 10 carbon atoms, e.g., butene-1, hexene-1, or octene-1, e.g., in a gas phase linear low density polyethylene (LLDPE) process or in a solution LLDPE process using Ziegler-Natta, metallocene, or single-site catalysts.

LLDPE typically has a density in the range of from 0.88 to 0.94 g/cm$^3$, preferably from 0.89 to 0.92 g/cm$^3$. It may be derived from ethylene together with other higher comonomers, such as butene-1, hexene-1 or octene-1.

MDPE typically has a density in the range of from 0.926 to 0.94 g/cm$^3$.

HDPE is a substantially linear polyolefin having a density of, for example, from about 0.95 g/cm$^3$ or higher, e.g., from about 0.952 g/cm$^3$ to about 0.970 g/cm$^3$, and a melting point of, for example, from about 266° F. to about 299° F. (from about 130° C. to about 148° C.).

Alternative thermnoplastic materials for the second skin layer include polyamides and polyesters, as well as co- and terpolymers of ethylene and ethylenically unsaturated carboxylic acids, such as methyl acrylate, butyl acrylate, ethyl acrylate, ethylene acrylic acid, ethylene methacrylic acid, combinations of these monomers, ionomers of the acid copolymers, ethylene-vinyl alcohol (EVOH), ethylene-vinyl acetate, maleic anhydride-grafted or modified polymer such as styrene maleic anhydride, polyethylene and polypropylene polymers modified with maleic anhydride, and the like. Blends of any of the foregoing homopolymers, copolymers and terpolymers are also contemplated.

For certain embodiments, it may be desirable for the second skin layer to be a heat-seal layer. Several of the materials identified above are illustrative heat-sealable materials, including the polyolefinic copolymers, terpolymers, and blends thereof.

In a film structure according to the present invention, the second skin layer may be contiguous to and in contact with the core layer, on a side of the core layer opposite the first skin layer. Alternatively, one or more intermediate, or tie, layers may be disposed between the second skin layer and the core layer. In such a case, the second skin layer will be contiguous to and in contact with a tie layer, and the core layer will be contiguous to and in contact with a tie layer. As will be readily understood, if there is only one tie layer disposed between the second skin layer and core layer, then the tie layer that is contiguous to and in contact with the core layer is the same tie layer that is contiguous to and in contact with the second skin layer.

Core Layer

A multilayer film according to the present invention comprises a core layer. The core layer preferably comprises a film-forming polyolefin, such as, for example, an isotactic propylene homopolymer (iPP), a propylene co- or terpolymer preferably made up of 90 wt % or more of propylene, high density polyethylene (HDPE), linear low density polyethylene (LLDPE), syndiotactic polypropylene (sPP), or combinations thereof. The film-forming polyolefins of the core layer may be Ziegler-Natta-catalyzed or metallocene-catalyzed.

The contemplated propylene polymers will generally have a melting point of $\geq 130°$ C. and a melt-flow rate (MFR) of from 0.5 to 8 g/10 min, e.g., from 1.5 to 5 g/10 min. Specific examples thereof include, but are not limited to, Fina 3371 (commercially available from Fina Oil and Chemical Company) and PD 4712E1 (commercially available from ExxonMobil Chemical). The contemplated ethylene polymers will generally have a melt index ranging from 0.5 to 15 g/10 min. Specific examples thereof include, but are not limited to, HDPE M-6211 and HDPE M-6030 from Equistar Chemical Company, and HD-6704.67 from ExxonMobil Chemical.

Cavitated Core Layer

If it is desired to produce an opaque film structure, a cavitating agent(s) can be added to the core layer. A suitable cavitating agent(s) includes any organic or inorganic material that is incompatible with (the term "incompatible" is used in the sense that the materials are two distinct phases), and has a higher melting point than, the film-forming polyolefin of the core layer, at least at the orientation temperature. For example, the cavitating agent(s) may be any of those described in U.S. Pat. Nos. 4,377,616 and 4,632,869, the entire disclosures of which are incorporated herein by reference. Specific examples of the cavitating agent(s) include polybutylene terephthalate (PBT), nylon, an acrylic resin, an ethylene-norborene copolymer, solid or hollow preformed glass spheres, metal beads or spheres, ceramic spheres, calcium carbonate, and combinations thereof. When the core layer comprising a cavitating agent(s) is subjected to uniaxial or biaxial orientation, a cavity forms, providing a film having an opaque appearance.

The average diameter of the cavitating agent may be from 0.1 to 10 $\mu$m. The agent may be of any desired shape or it may be substantially spherical in shape. This does not mean that every cavity will be the same size. It means that, in general, each cavity will tend to be of like shape when like particles are used, even if they vary in dimensions. For example, a cavity may assume a shape defined by two opposed and edge-contacting concave disks. The cavitating agent(s) may be present in the core layer at <30, or <20, or <10 or in the range of from 2–10 wt %, based on the total weight of the core layer.

The cavitating agent(s) may be added to the core layer by blending the cavitating agent(s) and the film-forming polyolefin at a temperature above the melting point of the film-forming polyolefin. This blending may take place in an extruder, such as a co-rotating, intermeshing twin screw extruder.

To preserve the structural integrity of the core layer, a thin layer of the film-forming polyolefin of the core layer, without the cavitating agent(s), may be coextruded on one or both sides of the film-forming polyolefin of the core layer. In this case, the total of the cavitating agent(s)-containing layer and the non-cavitating agent(s)-containing layer(s) may be considered the overall core layer of the film.

In addition to, or as an alternative to, the cavitating agent, the core layer may comprise an opacifying agent(s). Examples of the opacifying agent(s) include iron oxide, carbon black, titanium dioxide, talc, and combinations thereof. The opacifying agent(s) may be present in the core layer in an amount of from 1 to 15 wt %, or 1 to 8 wt %, or 2 to 4 wt %, based on the total weight of the core layer. Aluminum is another example of an opacifying agent that may be used in the core layer of the present film structure. Aluminum may be included in the core layer as an opacifying agent in an amount of from 0.01 to 1.0 wt %, or 0.25 to 0.85 wt %, based on the total weight of the core layer.

Tie Layer(s)

As previously described, one or more intermediate, or tie, layers may be disposed between the first skin layer and the core layer, and one or more intermediate, or tie, layers may be disposed between the second skin layer and the core layer. A tie layer of the present film structure may comprise any of the materials disclosed above in reference to the first skin layer, second skin layer, or core layer.

In particular embodiments, the tie layer will be chosen to maximize compatibility with the skin layer thereon and to maximize adhesion between said skin layer and core layer. For example, if the second skin layer comprises, e.g., EVOH, a tie layer comprising a maleic anhydride-grafted or modified polymer may preferably be disposed between the second skin layer and the core layer.

Other Ingredients

In order to modify or enhance certain properties of the present multilayer film for specific end uses, it is possible for one or more of the layers to contain appropriate additives in effective amounts. As will be readily understood by one of ordinary skill in the art, an "effective amount" is an amount sufficient to achieve the desired effect, e.g., an antiblocking effect for antiblock additives or an antistatic effect for antistatic additives. Examples of suitable additives may include, but are not limited to, waxes, pigments, colorants, antioxidants, antiozonants, antifogs, antistats, slip additives, antiblock additives, fillers such as calcium carbonate, diatomaceous earth, carbon black, and combinations thereof. In certain embodiments of the present invention, the metallized layer is free of additives, except for those additives that are added by the resin manufacturer, e.g., anti-oxidants or stabilizers.

More specific examples of antistatic additives, which can be used in amounts ranging from 0.05 to 3 weight %, based upon the total weight of the layer into which they are being incorporated, include alkali metal sulfonates, polyether-modified polydiorganosiloxanes, polyalkylphenylsiloxanes and tertiary amines.

More specific examples of antiblock additives include finely divided, inorganic antiblock materials, such as SYLOID, a synthetic amorphous silica gel that may comprise, e.g., 99.7% $SiO_2$; diatomaceous earth comprising, e.g., 92% $SiO_2$, 3.3% $Al_2O_3$, and 1.2% $Fe_2O_3$, and obtainable in various grades with average particle sizes ranging from 5 µm to 10 µm (the particles may be porous and irregularly shaped); dehydrated kaolin clays, such as KAOPOLITE SF comprising, e.g., 55% $SiO_2$, 44% $Al_2O_3$, 0.4% $Fe_2O_3$, which has an average particle size of 0.7 µm (the particles may be thin flat platelets); and synthetic precipitated silicates, such as SIPERNAT 44, comprising, e.g., 42% $SiO_2$, 36% $Al_2O_3$, 22% $Na_2O$ 22%, which has an average particle size of 3–4 microns (the particles may be porous and irregularly shaped). Spherical silica particles may be used as well. The amount of antiblock ranges, typically, from 0.002 to 0.5 wt %, based upon the total weight of the layer into which it is being incorporated.

Typical slip additives include higher aliphatic acid amides, higher aliphatic acid esters, waxes and metal soaps. A silicone oil or silicone gum having a viscosity that ranges from 10,000 to 2,000,000 cSt is another example of a suitable slip additive. An exemplary fatty amide slip additive is erucamide. The slip additive may be present in amounts ranging from 0.1 to 2 wt %, based upon the total weight of the layer into which it is being incorporated.

One example of a suitable antioxidant is a phenolic antioxidant, such as IRGANOX 1010, which is commercially available from Ciba-Geigy. Antioxidants may be present in an amount ranging from 0.1 to 2 wt %, based upon the total weight of the layer into which they are being incorporated.

One or more barrier additives may be employed in one or more of the layers of the present invention. Suitable barrier additives include, but are not limited to, low molecular weight resins, such as hydrocarbon resins, and more particularly, petroleum resins, styrene resins, cyclopentadiene resins, terpene resins, and alicyclic resins. These types of barrier additives are further described in U.S. Pat. No. 5,254,394, which is incorporated herein by reference. Examples of suitable, commercially available resins include PICCOLYTE, REGALREZ, and REGALITE, each of which are available from Hercules Corp., ESCOREZ, available from ExxonMobil Chemical, and ARKON, available from Arakawa Chemical Co. A barrier additive(s) may be present in a range of from 0.1 to 15 wt %, or from 0.5 to 10 wt %, or from 1 to 5 wt %, or from 1 to 3 wt %, based upon the total weight of the layer into which it is being incorporated.

One or more layers of the present multilayer film may also include a nucleator(s), such as MILLAD 3938 available from Milliken, in order to enhance crystal structure.

In a particular embodiment of the present invention, the second skin layer is compounded with a wax for lubricity. Any wax useful in thermoplastic films may be employed. The wax may be present in the second skin layer in an amount ranging from 2 to 15 wt %, based upon the total weight of the second skin layer.

Typically, a commercially available intensive mixer, such as those of the Bolling- or Banbury-type, can be employed in mixing a concentrate of the additive material and the polymer(s) of the selected layer until there is a uniform dispersion of the additive material in the polymer or polymer blend.

Film and Film Layer Thickness

Although the thickness of the multilayer film, and the thicknesses of the individual layers of the multilayer film, are not critical, in certain embodiments, the multilayer film may have a total thickness ranging from 10 µm to 75 µm, e.g., from 12 µm to 25 µm. The thickness relationship of the layers may be such that the core layer constitutes from 40 to 95 percent of the total film thickness, the first skin layer and second skin layer (if present) may constitute from 1 to 15 percent of the total film thickness, and the intermediate, or tie, layer(s) (if present) may constitute from 0 to 20 percent of the total film thickness.

For example, the first and second skin layers may each range from 0.5 µm to 5 µm, e.g., from 1 µm to 3 µm, while the core layer may range from 9.5 µm to 74.5 µm, or from 10 µm to 23. In general, the core layer should be of sufficient thickness to provide the necessary bulk properties, including barrier, stiffness, and the like, that are desired for product protection and good performance on packaging equipment.

Orientation

Generally, a film may be oriented in the direction of extrusion, i.e., "machine direction" (MD) orientation, and/or a film may be oriented in the direction perpendicular to the direction of extrusion, i.e., "transverse direction" (TD) orientation. In a blown film, orientation is generally effected by controlling, e.g., the take-up and blow-up ratio parameters. In a cast film, MD orientation may be effected by varying the take-up speed, and TD orientation may be effected with the use of tenter equipment, generally subsequent to extrusion.

A multilayer film according to the present invention may be uniaxially or biaxially oriented. In a preferred embodiment, a multilayer film according to the present invention is biaxially oriented by stretching it from 3 to 7 times, e.g., from 4.5 to 5.5 times, in the MD and from 5 to 10 times, e.g., from 8 to 10 times, in the TD.

Surface-treating

A multilayer film according to the present invention may be surface-treated on one or both of its outer surfaces to render the surface more receptive to metallization, coating, printing ink, or lamination. The film may be surface-treated during orientation, after orientation, or, e.g., in a metallization chamber. The surface treatment can be carried out by any method, including, but not limited to, corona discharge treatment, flame treatment, or plasma treatment. Although any of these techniques may be effectively employed, a particularly desirable method of surface-treatment is the so-called corona discharge treatment method, which comprises exposing the film surface to a high voltage corona discharge while passing the film between a pair of spaced electrodes. The outer surface(s) of the film may be treated to a surface tension level of at least about 35 dynes/cm, e.g. from about 38 to 55 dynes/cm, in accordance with ASTM Standard D2578-84.

In certain embodiments of the present invention, at least the outer surface of the first skin layer, i.e., the skin layer to be metallized, is surface-treated.

Surface-treating the outer surface(s) of the film may help insure that the metal layer and/or coating layer, if any, will be strongly adherent thereto, thereby reducing the possibility that the metal layer and/or coating layer is peeled or stripped from the film.

Metallization

One or both of the outer surfaces, such as, for example, the outer surface of the first skin layer, of a multilayer film according to the present invention may be metallized via the application thereto of a thin layer of metal (the outer surface of the first skin layer is the surface of the first skin layer that is opposite the core layer (or opposite the tie layer, if one is present between the first skin layer and the core layer)).

The outer surface(s) may be metallized by vacuum deposition, or any other metallization technique, such as electroplating or sputtering. The metal may be aluminum, or any other metal capable of being vacuum deposited, electroplated, or sputtered, such as, for example, gold, zinc, copper, or silver.

Typically, a metal layer is applied to an optical density of from 1.5 to 5.0, or from 1.8 to 2.6. Optical density is a measure of the absorption of visual light, and is determined by standard techniques. To calculate optical density, a commercial densitometer may be used, such as a Macbeth model TD 932, Tobias Densitometer model TDX or Macbeth model TD903. The densitometer is set to zero with no film specimen. A film specimen is placed over the aperture plate of the densitometer with the test surface facing upwards. The probe arm is pressed down and the resulting optical density value is recorded.

The resulting metallized film exhibits excellent oxygen transmission rate (OTR) and water vapor transmission rate (WVTR) characteristics. For example, a metallized film according to the present invention may exhibit an OTR of $\leq 20$ cc/m$^2$/24 hr, as determined in accordance with ASTM D 3985 at 73° F. (23° C.) and 0% relative humidity (RH), and a WVTR of $\leq 0.50$ g/m$^2$/24 hr, as determined in accordance with ASTM F 1249 at 100° F. (37.8° C.) and 90% RH. These improved physical properties make the film ideally suited for packaging food products, including those comprising liquids.

Coating

A multilayer film according to the present invention may have a coating layer applied to one or both of its outer surfaces. For example, the outer surface of the first skin layer may have a coating applied thereon, and/or the outer surface of the second skin layer may have a coating applied thereon. Preferably, any coating applied onto the outer surface of the first skin layer is applied after the outer surface of the first skin layer has been metallized, i.e., the coating is actually applied onto the metal layer that has been deposited on the first skin layer.

Examples of coatings that may be employed include acrylic coatings, such as those described in U.S. Pat. Nos. 3,753,769 and 4,865,908, both of which are incorporated herein by reference, acrylonitrile coatings, polyvinylidene chloride (PVDC) coatings such as those described in U.S. Pat. Nos. 4,214,039, 4,447,494, 4,961,992, 5,019,447 and 5,057,177, all of which are incorporated herein by reference, and a vinyl alcohol polymer coating, such as VINOL 325 available from Air Products, Inc.

The coating may be applied in an amount such that there will be deposited upon drying a smooth, evenly distributed layer that is sufficient to further enhance the, e.g., sealability and/or barrier characteristics of the final product. For example, the coating may be applied in an amount on the order of from about 0.01 to about 0.2 mil thickness, which may be roughly equivalent to 0.2 to 3.5 g per 1000 sq. in. of film. Alternatively, the coating may be present in an amount of from 1 to 25 wt %, preferably 7 to 15 wt %, based on the weight of the entire film. The coating on the film is subsequently dried by hot air, radiant heat or by any other convenient means.

Prior to the application of the coating, the film surface to be coated may be surface-treated or primed with a primer layer. An appropriate primer includes, but is not limited to, a poly(ethyleneimine) primer and an epoxy primer.

Laminating

One or both outer surfaces of a multilayer film according to the present invention may be laminated to a substrate. For example, the outer surface of the first skin layer may be metallized and subsequently laminated to a protective substrate. Laminating the outer surface(s) may, for many applications including packaging, labeling or imaging applications, serve to complete the structure necessary for the given application.

Examples of substrates that may be employed include, but are not limited to: a separate polymer film; a metal foil, such as aluminum foil; cellulosic webs, e.g., numerous varieties of paper such as corrugated paperboard, craft paper, glassine, and cartonboard; nonwoven tissue, e.g., spun-bonded polyolefin fiber and melt-blown microfibers; a metallizing layer; etc.

According to one embodiment of the present invention, the outer surface of the first skin layer is metallized and then laminated to a polymer film, e.g., a monolayer or multilayer polymer film. The film laminated to the outer surface of the present film may include a slip surface, a seal surface, a printed surface, or a combination thereof.

For especially rigorous processes of converting the present film into a commercial article, the metallized first skin layer and/or the, e.g., printed second skin layer, are protected via lamination, such that the metallized layer and/or printed layer end up on the inside of a multilayer film structure.

The outer surface(s) of the present multilayer film may be laminated to a substrate by employing a suitable adhesive, e.g., a hot melt adhesive such as low density polyethylene, ethylene-methacrylate copolymer, water-based adhesives such as polyvinylidene chloride latex, and the like. Alternatively, the lamination may be accomplished via extrusion lamination using, e.g., a polyethylene or ethylene co- or terpolymer. In certain embodiments, the outer surface may be laminated to a substrate via heat lamination, which uses heat and pressure to apply a lamination film onto a substrate and improves the durability of the substrate without the need for more expensive water-based lamination or environmentally unfriendly solvent-based lamination.

Process of Making the Film

A multilayer film according to the present invention may be formed by (i) coextruding melts for the core layer and first skin layer, together with the melts for any additional layers, through, e.g., a flat sheet extruder die at a temperature that may range from 200° C. to 250° C. to form a coextruded sheet, (ii) casting the coextruded sheet onto a cooling drum, and (iii) quenching the coextruded sheet. The sheet may then be reheated and oriented to form a film, and (optionally) surface-treated, metallized, coated, and/or laminated, each as described earlier.

The film may be printed by any means, including, but not limited to, letterpress, offset, silk screen, electrostatic and photographic methods. More specific examples of printing methods include thermal dye transfer (including dye sublimation), lithographic printing, flexographic printing, gravure printing, hot stamping, valley printing, roll-leaf printing and spanishing. Alternatively, printed matter may be provided to a film according to the present invention by laminating a second film containing a printed layer to the present film, as has been described.

A multilayer film according to the present invention is suitable for a wide range of applications, including, in addition to those already described herein above and many others not expressly recited herein, controlled atmosphere packaging and long-term display of snack foods.

Definitions and Testing Protocols

| | |
|---|---|
| Melt Flow Rate (MFR): | ASTM D-1238, condition L @ 230° C. |
| Melt Index (MI): | ASTM D-1238, condition E @ 190° C. |
| Oxygen Transmission Rate: | ASTM D 3985 at 73° F. (23° C.) and 0% relative humidity (RH) |
| Water Vapor Transmission Rate: | ASTM F 1249 at 100° F. (37.8° C.) and 90% RH |

Melting Point, $T_m$

A weighed polymer sample, equilibrated to 25° C., is heated beyond its melting point at a rate of 10° C. per minute. The sample is cooled at 10° C. per minute to 25° C., and allowed to equilibrate for 3 minutes. The sample is then reheated at 10° C. per minute. The melting point is defined as the point where, during melting of the sample, the peak endothermic heat flow required to maintain the 10° C. per minute temperature rate is observed. The crystal heat of fusion ($\Delta$Hf) is calculated from the area under the curve, from the point the sample begins to melt to the point where melting is completed. This method has been described herein above as the ExxonMobil melting point method, and has been used to calculate each and every disclosed melting point recited herein.

Melting Behavior

The thermal properties (melting point and crystal heat of fusion $\Delta$Hf) of seven polymer samples were measured. The first four polymer samples, including a pair of metallocene-catalyzed propylene homopolymers and a pair of metallocene-catalyzed EP copolymers, are preferred polyolefins for the first skin layer of the present invention. The fifth polymer sample was also a metallocene-catalyzed EP copolymer, but, as will be seen, it had a melting point outside the preferred range. The sixth and seventh samples were a Ziegler-Natta-catalyzed EP copolymer and a Z-N-catalyzed propylene homopolymer, respectively. Propylene-based polymers that are metallocene-catalyzed tend to have a melting point that is 8–12° C. lower than Ziegler-Natta-catalyzed propylene-based polymers having comparable ethylene comonomer content. For example, Fina 6573xHC Z-N EP copolymer has an approximately equal ethylene comonomer content as Fina EOD0103, but a melting point that is 12° C. lower.

The weighed samples were equilibrated to 25° C., and heated beyond melting at a rate of 10° C. per minute. The samples were cooled, at a rate of 10° C. per minute, to 25° C., and allowed to equilibrate for 3 minutes. The samples were then reheated at 10° C. per minute. The melting points of the samples were defined as the points where, during melting of the samples, the peak endothermic heat flow required to maintain the 10° C. per minute temperature rate was observed. The crystal heat of fusion ($\Delta$Hf) was calculated from the area under the curve from the point each sample began to melt to the point where melting was completed.

TABLE I

Thermal Properties

| Polymer | Melting Point* | $\Delta$Hf* |
|---|---|---|
| Fina EOD9809 mPP homopolymer | 154° C. | 76 J/g |
| Fina EOD0007 mPP homopolymer | 151° C. | 76 J/g |
| Fina EOD0103 mPP EP copolymer | 134° C. | 63 J/g |
| Fina EOD0104 mPP EP copolymer | 134° C. | 61 J/g |
| Fina EOD0106 mPP EP copolymer | 114° C. | N/A |

TABLE I-continued

Thermal Properties

| Polymer | Melting Point* | $\Delta$Hf* |
|---|---|---|
| Fina 6573xHC Z-N EP copolymer | 146° C. | 71 J/g |
| Fina 3371 Z-N PP homopolymer | 161° C. 10° C./min | 114 J/g |

*$T_m$ or melting point determined by above procedure
**$\Delta$Hf determined by above procedure

EXAMPLES

Examples 1–4

Examples 1–4 compare the oxygen transmission rate (OTR) (cc/m²/24 hr) as a function of the energy density (J/m²) supplied to an in-chamber plasma surface treater for a pair of films and film laminates. The results from the comparison are presented at Table II, wherein the entries in the tables represent OTR (cc/m²/24 hr).

The first film, a comparative film identified as PP in Table II, has a total thickness of 18 µm and the following 3-layer structure:

| | |
|---|---|
| 2nd SKIN | Fina 6573XHC-an EP copolymer plus antiblock (0.75 µm thick) |
| CORE | Fina 3371-a Ziegler-Natta-catalyzed propylene homopolymer (16.75 µm thick) |
| 1st SKIN | Fina 3371-a Ziegler-Natta-catalyzed propylene homopolymer (0.5 µm thick) |

The second film, a film according to the present invention identified as mPP in Table II, has a total thickness of 18 µm and the following structure:

| | |
|---|---|
| 2nd SKIN | Fina 6573XHC-an EP copolymer plus antiblock (0.75 µm thick) |
| CORE | Fina 3371-a Ziegler-Natta-catalyzed propylene homopolymer (16.75 µm thick) |
| 1st SKIN | Fina EOD 98-09-a metallocene-catalyzed propylene homopolymer having a MFR of 3 g/10 min (0.5 µm thick) |

For each of Examples 1–4, PP films and mPP films received (1) flame-treatment on the outer surface (the surface opposite the core) of the first skin layer to a surface tension level of approximately 50 dyne/cm² prior to being wound after the biaxial orientation process, (2) varying degrees of plasma-treatment on the outer surface of the first skin layer in the vacuum chamber of a metallizer just prior to being metallized, and (3) a metal layer on the outer surface of the first skin layer. Regarding the varying degrees of plasma treatment, the energy supplied to the in-chamber plasma surface treater was varied in each of Examples 1–4, from 0 J/m² (indicating no plasma treatment) to 600 J/m² to a high of 1,130 J/m². The gas supplied to the in-chamber plasma surface treater was a blend of argon an,d carbon dioxide.

For Example 1, the OTR of PP and mPP films was measured just prior to lamination.

For Example 2, the OTR of PP and mPP films was measured after the films were laminated at the metallized surface of the first skin layer to 75LBW, a conventional 3-layer film commercially available from ExxonMobil Chemical. 75LBW has a total thickness of 19 μm (75 gauge units), a flame-treated first skin layer of HDPE (0.5 μm thick), a core layer of propylene homopolymer (17.75 μm thick), and a flame-treated, slip-modified second skin layer of propylene homopolymer that contains antiblock (0.75 μm thick). The lamination process involved extruding and casting a molten polyethylene layer (Chevron 1017) between the 75 LBW (on the second skin layer side) and either the PP or mPP film (on the metallized surface of the first skin layer), and pressing together to forn. a laminate. The weight of the extruded Chevron 1017 is 7 lb/ream, and the tension on either the PP or mPP film prior to lamination is 0.2 lb/in.

For Example 3, the OTR of PP and mPP films was measured after the laminated PP and mPP films of Example 2 were pulled over a VFFS packaging machine forming collar simulator (1/64" radius anvil).

For Example 4, the OTR of PP and mPP films was measured after the films were laminated in a manner identical to the procedure in Example 2, except that the tension on either the PP or mPP film prior to lamination was increased to 0.7 lb/in. The higher tension represents a severe test for inducing crazes.

Thus, Examples 1–3 compare the films both initially after manufacture (Example 1) and at various stages of the converting process (Examples 2 and 3). Example 4 is identical to Example 2, except for the higher lamination tension.

TABLE II

| Energy density | OTR (cc/m²/24 hr) | |
|---|---|---|
| | PP | mPP |
| EXAMPLE 1 | | |
| 0 J/m² | 54 | 15 |
| 600 J/m² | 21 | 18 |
| 1,130 J/m² | 21 | 18 |
| EXAMPLE 2 | | |
| 0 J/m² | 29 | 17.5 |
| 600 J/m² | 25 | 17 |
| 1,130 J/m² | 16.5 | 15.5 |
| EXAMPLE 3 | | |
| 0 J/m² | 31 | 16 |
| 600 J/m² | 23 | 16.5 |
| 1,130 J/m² | 19.5 | 16.8 |
| EXAMPLE 4 | | |
| 0 J/m² | 16.5 | 15.1 |
| 600 J/m² | 16 | 13.75 |
| 1,130 J/m² | 15.6 | 13.6 |

As can be seen from Table II, in all instances, the mPP film or laminated mPP film exhibited a better OTR than a PP film or laminated PP film. Example 3 represents conditions that are most like present-day commercial operation processes, including commercial winding tensions. The OTR testing in Example 3 was performed after simulated vertical form, fill, and sealing (VFFS) of a package. At zero energy density (0 J/m²), the laminated mPP film outperformed the laminated PP film by nearly 50 percent.

A pair of other points are notable from Table II. The mPP films or laminated mPP films exhibited a remarkably low OTR ($\leq 17.5$ cc/m²/24 hr), and were especially superior to the PP films or laminated PP films, at zero energy density (0 J/m²) for each of Examples 1–4. Therefore, a film according to the present invention can do without the additional plasma treatment of the present Examples, and still exhibit an excellent OTR, thereby eliminating an extra step from the process. Furthermore, as the energy supplied to the in-chamber plasma surface treater is increased, the PP films or laminated PP films tend to slightly close the gap in OTR. As shown in Example 4, however, this does not happen at high lamination tension, which is a severe test for inducing crazes. This fact is especially surprising considering that the melting point of metallocene-catalyzed polypropylene is approximately 10° C. lower than that of Ziegler-Natta-catalyzed polypropylene.

Examples 5–10

For Examples 5–10, sample films A, B, and C were prepared. Each of films A, B, and C had a total thickness of 18 μm (70 gauge units) and the following general structure:

| | |
|---|---|
| 2nd SKIN | CHISSO 7794-an EPB terpolymer plus antiblock (1.25 μm thick) |
| CORE | Fina 3371-a Ziegler-Natta-catalyzed propylene homopolymer |
| 1st SKIN | Different for each of A, B, and C |

Film A is a film according to the present invention. Its 1st SKIN is 0.75 μm thick, and consists of Fina EOD 01-03, which is a metallocene-catalyzed EP copolymer having a MFR of 8 g/10 min.

Film B is a comparative film that emulates Met-HB, a film commercially available from ExxonMobil Chemical. Its 1st SKIN is 0.5 μm thick, and consists of HDPE.

Film C is a film according to the present invention. Its 1st skin is 0.75 μm thick, and consists of a 50/50 blend of Fina EOD 01-03 and Fina EOD 00-07, which is a metallocene-catalyzed propylene homopolymer.

Each of films A, B, and C received (1) flame-treatment on the outer surface (the surface opposite the core) of the first skin layer to a surface tension level of approximately 50 dyne/cm² prior to being wound after the orientation process (the orientation process stretched the films to a degree of 5.1 times in the MD and 8 times in the TD), and (2) a metal layer on the outer surface of the first skin layer.

Films A, B, and C were laminated at the metallized surface of the first skin layer to 75LBW (described herein above). The lamination process involved extruding and casting a LDPE layer between the 75 LBW (on the second skin layer side) and the films A, B, or C (on the metallized surface of the first skin layer), and pressing together to form a laminate. The weight of the extruded LDPE varied between 8 lb/ream and 10 lb/ream. The OTR and WVTR of laminated films A, B, and C was measured before and after they were pulled over a VFFS packaging machine forming collar simulator (1/64" radius anvil). The results from Examples 5–10 are presented below at Table III (OTR is given in cc/m²/24 hr; WVTR is given in g/m²/24 hr).

TABLE III

| | | OTR (cc/m²/24 hr) | | WVTR (g/m²/24 hr) | |
|---|---|---|---|---|---|
| Ex. | Film | OTR before anvil | OTR after anvil | WVTR before anvil | WVTR after anvil |
| LAMINATED WITH 8 LB/REAM LDPE | | | | | |
| 5 | B | 21.2 | 41.2 | 0.10 | 0.18 |
| 6 | A | 10.2 | 15.7 | 0.08 | 0.12 |
| 7 | C | 4.8 | 12.6 | 0.02 | 0.12 |

TABLE III-continued

OTR (cc/m²/24 hr) WVTR (g/m²/24 hr)

| Ex. | Film | OTR before anvil | OTR after anvil | WVTR before anvil | WVTR after anvil |
|---|---|---|---|---|---|
| | | LAMINATED WITH 10 LB/REAM LDPE | | | |
| 8 | B | 27.7 | 86.5 | 0.11 | 0.52 |
| 9 | A | 9.4 | 43.8 | 0.05 | 0.28 |
| 10 | C | 3.6 | 13.4 | 0.02 | 0.12 |

As can be seen from Table III, in Examples 5–10, the mPP-containing laminated films (A and C) in all cases had at least a 49% lower OTR and a 20% lower WVTR than the comparative film, even after simulated FFS.

Examples 11–13

Films D, E, and F were prepared for Examples 11, 12, and 13, respectively. Each of films D, E, and F had a total thickness of 18 μm (70 gauge units) and the following general structure:

| | |
|---|---|
| 2$^{nd}$ SKIN | CHISSO 7794-an EPB terpolymer plus antiblock (1.25 μm thick) |
| CORE | Fina 3371-a Ziegler-Natta-catalyzed propylene homopolymer |
| 1$^{st}$ SKIN | Different for each of D, E, and F |

Film D is a comparative film. Its 1$^{st}$ SKIN is 0.5 μm thick, and consists of Fina 6573, which is a Ziegler-Natta-catalyzed propylene copolymer.

Film E is a film according to a preferred embodiment of the invention. Its 1$^{st}$ SKIN is 0.5 μm thick, and consists of Fina EOD 0103, which is a metallocene-catalyzed propylene copolymer.

The 1$^{st}$ SKIN of Film F is 0.5 μm thick, and consists of Fina EOD 0106. Fina EOD 0106 is a metallocene-catalyzed propylene copolymer, but it has a melting point outside the preferred range.

Each of films D, E, and F received (1) flame-treatment on the outer surface (the surface opposite the core) of the first skin layer to a surface tension level of approximately 50 dyne/cm² prior to being wound after the orientation process (the orientation process stretched the films to a degree of 5.1 times in the MD and 8 times in the TD), and (2) a metal layer on the outer surface of the first skin layer. The OTR and WVTR of films D, E, and F was measured after the metallization.

TABLE IV

| | OTR (cc/m²/24 hr) | WVTR (g/m²/24 hr) |
|---|---|---|
| Example 11-Film D | 154.7 | 1.24 |
| Example 12-Film E | 14.9 | 0.26 |
| Example 13-Film F | 258.8 | 0.775 |

The foregoing describes in detail certain combinations of thermoplastics and metallization of thermoplastics, their fabrication into useful articles such as multilayer films, and uses of these articles. Those skilled in the art will appreciate that numerous modifications to these embodiments may be made without departing from the scope of the invention. For example, while certain specific film layer compositions, including certain non-thermoplastic additives within those layers, and certain layer arrangements of the film are exemplified, other compositions and arrangements are also contemplated. Additionally, while packaging, labeling and imaging are included among the uses for the inventive films, other uses are also contemplated. To the extent that the foregoing description is specific, it is solely for the purpose of illustrating certain embodiments of the invention, and should not be taken as limiting the present inventive concepts to the specific embodiments described hereinabove. Accordingly, the spirit and scope of the appended claims should not be limited to the description of the specific embodiments contained herein.

What is claimed is:

1. An oriented multilayer film, comprising:
  c) a core layer comprising a polyolefin; and
  d) a first skin layer comprising a polyolefin selected from the group consisting of (i) a metallocene-catalyzed, substantially isotactic propylene homopolymer, (ii) a metallocene-catalyzed propylene copolymer, and (iii) blends thereof,
wherein the core layer has a first surface and a second surface, the first skin layer has a first and a second surface, the second surface of the first skin layer is contiguous to and in contact with the first surface of the core layer, and the first surface of the first skin layer is metallized.

2. The oriented multilayer film of claim 1, wherein the core layer comprises a polyolefin selected from the group consisting of a metallocene-catalyzed polypropylene (mPP), a metallocene-catalyzed polyethylene (mPE), a Ziegler-Natta-catalyzed polypropylene (Z-N PP), a Ziegler-Natta-catalyzed polyethylene (Z-N PE) and blends thereof.

3. The oriented multilayer film of claim 1, wherein the polyolefin of the first skin layer has a melting point ($T_m$) of from 120° C. to 155° C.

4. The oriented multilayer film of claim 1, wherein the film has an oxygen transmission rate (OTR) of $\leq 20$ cc/m²/24 hr, as determined in accordance with ASTM D 3985 at 73° F. (23° C.) and 0% relative humidity (RH), and a water vapor transmission rate (WVTR) of $\leq 0.50$ g/m²/24 hr, as determined in accordance with ASTM F 1249 at 100° F. (37.8° C.) and 90% RH.

5. The oriented multilayer film of claim 1, further comprising a second skin layer, wherein the second skin layer has a first surface and a second surface, and the first surface of the second skin layer is contiguous to and in contact with the second surface of the core layer.

6. The oriented multilayer film of claim 5, wherein the second skin layer comprises a polymer selected from the group consisting of a substantially isotactic polypropylene, a substantially syndiotactic polypropylene, a polyethylene, a propylene copolymer having an ethylene or $C_4$–$C_{20}$ α-olefin comonomer, a propylene terpolymer having at least one of ethylene and butene-1 as one comonomer, an ethylene-vinyl acetate (EVA), an ethylene-methyl acrylate (EMA), an ethylene-ethyl acrylate (EEA), an ethylene-n-butyl acrylate (EnBA), an ethylene-acrylic acid (EAA), an ethylene-methacrylic acid (EMAA), an ethylene-vinyl alcohol (EVOH), and blends thereof.

7. The oriented multilayer film of claim 6, wherein the second skin layer comprises a propylene-ethylene-butene-1 terpolymer.

8. The oriented multilayer film of claim 5, further comprising one or both of (i) a coating on a second surface of the second skin layer and (ii) a coating on the metallized surface of the first skin layer.

9. A laminate, comprising the oriented multilayer film of claim 1 laminated at the metallized surface of the first skin layer to a second film.

10. The laminate of claim 9, wherein the second film is a multilayer film comprising at least one printed layer.

11. The oriented multilayer film of claim 1, wherein the first skin layer consists essentially of a metallocene-catalyzed, substantially isotactic propylene homopolymer.

12. The oriented multilayer film of claim 1, wherein the first skin layer consists essentially of a metallocene-catalyzed propylene copolymer.

13. The oriented multilayer film of claim 1, wherein the oriented multilayer film is a biaxially oriented multilayer film.

14. A process for producing the oriented multilayer film of claim 1, comprising:
- e) coextruding melts corresponding to the core layer and the first skin layer to form a coextruded sheet;
- f) cooling the coextruded sheet;
- g) orienting the coextruded sheet to form an oriented multilayer film; and
- h) metallizing the oriented multilayer film on the first surface of the first skin layer.

15. The process of claim 14, wherein the oriented multilayer film further comprises a second skin layer contiguous to and in contact with the second surface of the core layer, and in step (a) of the process, melts corresponding to the core layer, first skin layer, and second skin layer are coextruded to form a coextruded sheet.

16. The process of claim 14, wherein in step (c) of the process, the coextruded sheet is biaxially oriented to form a biaxially oriented multilayer film.

17. The process of claim 14, further comprising a step (cc) after the orienting step (c) and before the metallizing step (d), wherein in step (cc), the oriented multilayer film is surface-treated on the first surface of the first skin layer.

18. An oriented multilayer film, comprising:
- a) a core layer comprising a polyolefin; and
- b) a first skin layer comprising a polyolefin selected from the group consisting of (i) a metallocene-catalyzed, substantially isotactic propylene homopolymer, (ii) a metallocene-catalyzed propylene copolymer, and (iii) blends thereof, wherein the core layer has a first surface and a second surface, the first skin layer has a first and a second surface, one or more tie layers are present between the second surface of the first skin layer and the first surface of the core layer, and the first surface of the first skin layer is metallized.

19. The oriented multilayer film of claim 18, further comprising a second skin layer on the second surface of the core layer.

20. The oriented multilayer film of claim 18, further comprising a second skin layer, wherein the second skin layer has a first surface and a second surface, and one or more tie layers are present between the first surface of the second skin layer and the second surface of the core layer.

* * * * *